(12) United States Patent
De Tommasi (10) Patent No.: US 8,825,274 B2
(45) Date of Patent: Sep. 2, 2014

(54) METHOD FOR CALIBRATING INERTIAL SENSOR INSTALLED IN ARBITRARY POSITION ON BOARD VEHICLE AND SENSOR SYSTEM OF DYNAMICS OF VEHICLE ABLE TO BE INSTALLED ON BOARD IN ARBITRARY POSITION

(75) Inventor: Claudio De Tommasi, Grugliasco (IT)

(73) Assignee: Magneti Marelli S.p.A., Corbetta (Milano) (IT)

( * ) Notice: Subject to any disclaimer, the term of this patent is extended or adjusted under 35 U.S.C. 154(b) by 223 days.

(21) Appl. No.: 13/336,034

(22) Filed: Dec. 23, 2011

(65) Prior Publication Data
US 2012/0330497 A1 Dec. 27, 2012

(30) Foreign Application Priority Data
Dec. 24, 2010 (IT) ................ TO2010A1062

(51) Int. Cl.
*G01M 17/00* (2006.01)
(52) U.S. Cl.
USPC ........................................... 701/31.1
(58) Field of Classification Search
USPC ........................................... 701/33.1
See application file for complete search history.

(56) References Cited

U.S. PATENT DOCUMENTS

| | | | |
|---|---|---|---|
| 5,828,585 A * | 10/1998 | Welk et al. ....................... | 702/96 |
| 5,912,635 A * | 6/1999 | Oshizawa et al. .............. | 340/988 |
| 6,801,855 B1 * | 10/2004 | Walters et al. ................ | 701/410 |
| 2008/0046214 A1 * | 2/2008 | Fowler .......................... | 702/150 |

FOREIGN PATENT DOCUMENTS

| | | |
|---|---|---|
| WO | 02/18873 A2 | 3/2002 |
| WO | WO 0218873 A2 * | 3/2002 |
| WO | 2009/006341 A1 | 1/2009 |
| WO | WO 2009006341 A1 * | 1/2009 |

OTHER PUBLICATIONS

Jan. 30, 2012 European Search Report for EP 11 19 5542.

* cited by examiner

*Primary Examiner* — Fadey Jabr
*Assistant Examiner* — Yazan A Soofi
(74) *Attorney, Agent, or Firm* — Howard & Howard Attorneys PLLC (57) ABSTRACT

A method calibrates an inertial-sensor device installed in an arbitrary position on board a vehicle and adapted to detect at least one entity indicative of vehicle dynamics along at least one direction of a local reference-coordinate system. The method includes steps of: acquiring by the inertial-sensor device at predetermined measuring times real-measured data indicative of the vehicle dynamics in the local reference-coordinate system; acquiring by a calibrating detector different from the inertial-sensor device, at sampling times coinciding with the measuring times, reference-measured data indicative of the vehicle dynamics in a vehicle-coordinate system; and generating a coordinate-transformation matrix adapted to correlate the entity measured in the local reference-coordinate system with a corresponding entity in the vehicle-coordinate system. Also, a sensor system of dynamics of the vehicle is able to be installed on board in an arbitrary position.

14 Claims, 4 Drawing Sheets

METHOD FOR CALIBRATING INERTIAL SENSOR INSTALLED IN ARBITRARY POSITION ON BOARD VEHICLE AND SENSOR SYSTEM OF DYNAMICS OF VEHICLE ABLE TO BE INSTALLED ON BOARD IN ARBITRARY POSITION

CROSS-REFERENCE TO RELATED APPLICATION

This application claims priority to and benefit of the filing date of Italian Patent Application TO2010A001062 filed on Dec. 24, 2010 and entitled "Method for Calibrating an Inertial Sensor Installed in an Arbitrary Position on Board a Vehicle, and Sensor System of the Dynamics of a Vehicle Able to be Installed on Board in an Arbitrary Position."

BACKGROUND OF INVENTION

1. Field of Invention

The invention relates, generally, to installation and operation of inertial sensors—for example, attitude sensors (gyroscopes) or movement sensors (accelerometers)—on board a vehicle and, more specifically, to a calibration method of an inertial attitude or movement sensor installed in an arbitrary position on board the vehicle and a sensor system of dynamics of a vehicle.

2. Description of Related Art

There is increasingly common use of vehicles that have inertial sensors, such as attitude or acceleration sensors, installed on board to provide accurate indications on the orientation of the vehicle in space and its movement dynamics. Such devices not only help in the operation of on-board driving assistance systems, but are essential for the functionality of other auxiliary systems—including, but not limited to, systems for tracking and recording the movements of the vehicle used in anti-theft devices or in devices, known by the term "black box," for detecting traffic violations or the dynamics of road accidents.

For this purpose, vehicles can, right from the time of manufacture, include orientation-sensor devices (for example, a three-axis gyroscope) and movement-sensor devices (for example, a three-axis accelerometer) adapted to precisely detect and measure the attitude and movement of the vehicle in three dimensions. If these devices are not foreseen at the time of manufacture of the vehicle, they can advantageously be installed at a later time, as aftermarket installations. Both in the first and, above all, second case, however, it is not easy in all vehicle models to set positioning constraints of the sensor device so that its local measuring axes are aligned with the main axes of the vehicle. Constraining the installation of such a sensor device to its correct orientation with respect to the main axes of the vehicle would require an excessive installation time (for accurate installation and for checking that the constraints and the correspondence of the measurements are respected). In any case, it would not preclude possible errors in configuration and measurement such as to jeopardize the correct operation of the system that uses the measurement data of such a sensor.

For this reason, it is known to foresee the arbitrary arrangement of a sensor device on board a vehicle in the most convenient location in the engine cavity or dashboard (for example, in the most easily accessed free seat) and then carry out its calibration with respect to the axes of the vehicle calculating a conversion matrix (or coordinate-transformation matrix or even rotation matrix) adapted to relate the entities measured in the local reference system with those desired in the main reference system of the vehicle.

WO 02/18873 describes a calibration technique for an accelerometer sensor installed in an arbitrary position on board a vehicle based on directly determining six coefficients of the matrix and calculating the remaining three. The direct determining of the six coefficients of the matrix takes place by comparison between respective "acceleration" values detected by the sensor in the local reference system and corresponding real acceleration measurements referring to the vehicle-coordinate system and obtained through a satellite-positioning system integrated in the vehicle. The calculation of the remaining three coefficients of the matrix is obtained by mathematically imposing orthogonality constraints between the directions of the axes of the reference systems.

Disadvantageously, this mixed approach, which reduces the physical measurements to the minimum and fills in the data of the coordinate-transformation matrix based on pure mathematical orthogonality relationships existing between the axes of the reference systems, results in the propagation of measurement errors suffered by the six measurements also on the three items of data collected and causes the risk of concentrating an excessive error on one of the measurement axes, which would significantly compromise the functionality of the application that is based on the accelerometer data of the vehicle.

Thus, there is a need in the related art for a method for calibrating an inertial sensor installed in an arbitrary position on board a vehicle. More specifically, there is a need in the related art for such a calibration method that does not result in propagation of measurement errors, not cause risk of concentrating an excessive error on any measurement axis, and not significantly compromise functionality of application based on accelerometer data of the vehicle. There is a need in the related art also for a sensor system of dynamics of the vehicle able to be installed on board in an arbitrary position.

SUMMARY OF INVENTION

The invention overcomes the disadvantages in the related art in a method for calibrating an inertial-sensor device installed in an arbitrary position on board a vehicle and adapted to detect at least one entity indicative of vehicle dynamics along at least one direction of a local reference-coordinate system. The method includes steps of: acquiring by the inertial-sensor device at predetermined measuring times real-measured data indicative of the vehicle dynamics in the local reference-coordinate system; acquiring by a calibrating detector different from the inertial-sensor device, at sampling times coinciding with the measuring times, reference-measured data indicative of the vehicle dynamics in a vehicle-coordinate system; and generating a coordinate-transformation matrix adapted to correlate the entity measured in the local reference-coordinate system with a corresponding entity in the vehicle-coordinate system. All elements of the coordinate-transformation matrix are computed by comparing the real-measured data acquired by the initial-sensor device with the corresponding reference-measured data obtained in a plurality of different driving conditions. The real-measured data include a quantity of items of data substantially equal to a quantity of the elements of the coordinate-transformation matrix. A value of each of the elements of the coordinate-transformation matrix is adjusted by forcing a constraint of orthogonality to obtain an orthogonal-transformation matrix that is closest to the coordinate-transformation matrix obtained based on the measured data.

The calibration method according to the invention is based on the principle of determining the attitude or movement of a vehicle referring to a vehicle-coordinate system from the attitude or movement data measured by an inertial-sensor device installed on board the vehicle in an arbitrary position and, therefore, referring to the sensor device's own coordinate system (local reference system) by a coordinate-transformation matrix.

The transformation matrix is calculated from the real-measured data of the entities indicative of the attitude or movement of the vehicle (obtained from the onboard-sensor device) and corresponding real reference-measured data of the vehicle dynamics referring to the vehicle-coordinate system (obtained by a different calibrating detector—for example, through a satellite-positioning system integrated in the vehicle).

All of the coefficients of the transformation matrix are calculated by comparison of the aforementioned real-measured data through a number of measurements independent of the entities indicative of the attitude or movement of the vehicle equal to the number of columns of the matrix.

The error on the coefficients of the transformation matrix calculated from the real-measured data is distributed over all of the coefficients by forcing a constraint of orthogonality on the matrix itself, obtaining the rotation matrix closest to the calculated matrix.

The calibration method according to the invention uses real measured-reference data of the dynamics of the vehicle obtained through a GPS receiver, advantageously filtered to ensure the optimal dynamic measuring conditions and accuracy of the signal received.

Other sources of measured data of the dynamics of the vehicle can be considered as a reference as an alternative to the data of a GPS receiver or different positioning system (for example, angular-speed sensors or differential-odometric sensors integrated on board the vehicle for the autonomous measurement of the distances travelled through the rotation measurements of the wheels of the vehicle).

The essential characteristics of the calibration method according to the invention (described with reference to, for example, an accelerometer sensor) can be advantageously applied to calibrate other types of inertial attitude or movement sensors the measuring data of which must refer to one, two, or more axes of the vehicle (for example, a tri-axial gyroscope).

An advantage of the of the calibration method according to the invention is that it facilitates the installation of an inertial sensor—such as an attitude or movement sensor (in an embodiment, a tri-axial sensor)—on board a vehicle according to an arbitrary orientation, but making it possible to detect attitude or movement data of the vehicle that can be related to the main axes of the vehicle itself to be used for significant applications only in the context of a reference system centred on the vehicle.

Another advantage of the of the calibration method according to the invention is that it provides a satisfactory solution to the problem outlined above, avoiding the drawbacks of the related art.

Another advantage of the of the calibration method according to the invention is that it calibrates an inertial attitude- or movement-sensor device installed on board a vehicle in an arbitrary position and is as accurate as possible, with low errors in determining the coefficients of the coordinate-transformation matrix between the local reference system of the sensor device and reference system of the vehicle.

Another advantage of the of the calibration method according to the invention is that it is automatic; requires simple implementation, minimal computing burdens, and low power consumption; and favors speed and accuracy of execution.

Other objects, features, and advantages of the invention are readily appreciated as the same becomes better understood while the subsequent detailed description of embodiments of the invention is read taken in conjunction with the accompanying drawing thereof.

BRIEF DESCRIPTION OF EACH FIGURE OF DRAWING OF INVENTION

DETAILED DESCRIPTION OF EMBODIMENTS OF INVENTION

Figure 1:
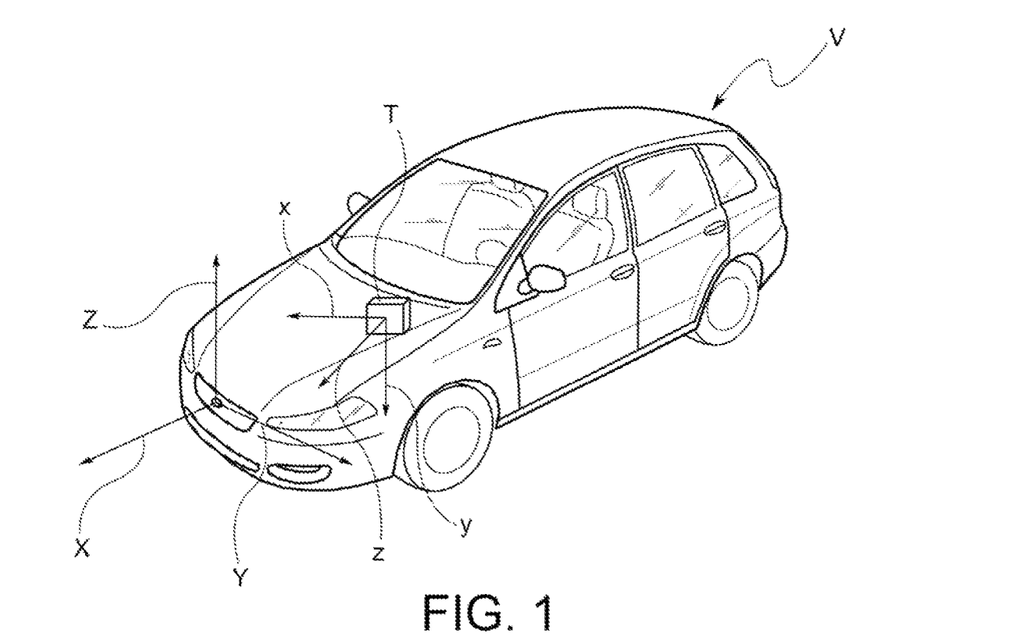
FIG. 1 is a schematic representation of a vehicle equipped with an accelerometer device applied in an arbitrary position, wherein the main axes of a reference system centred on the vehicle and axes of a reference system local to the accelerometer device are identified.

In the figures, like letters and numerals are used to represent like method steps and structure. In FIG. 1 the letter "V" generally indicates a vehicle, equipped with a telematic unit "T" arranged to detect the dynamic conditions of the vehicle—in particular, adapted to measure the accelerations undergone by the vehicle while travelling as a function of the different driving conditions.

The telematic unit "T" includes an attitude- or movement-sensor device "S"—for example (but not exclusively), a three-axis accelerometer device—installed in an arbitrary position and adapted to measure the linear and centripetal accelerations undergone by the sensor in the components directed according to the local axes of the device, identified in the figures as "x," "y," and "z."

Again in FIG. 1, "X," "Y," and "Z" indicate the main axes of the vehicle, commonly identified as longitudinal, transversal, and vertical axis and with respect to which the movements of the vehicle are defined (for example, the speeds, accelerations, and angles of inclination thereof in all travel conditions).

The telematic unit "T" can be installed on board the vehicle at the time of manufacture and interfaced with a communication line integrated on board (for example, the "CAN" bus) to transfer the measured data to other processing units of the vehicle. Alternatively, the unit is installed on board the vehicle after its production and connected to the other processing units through a dedicated communication line, not being possible to access the "CAN" network.

Figure 2:
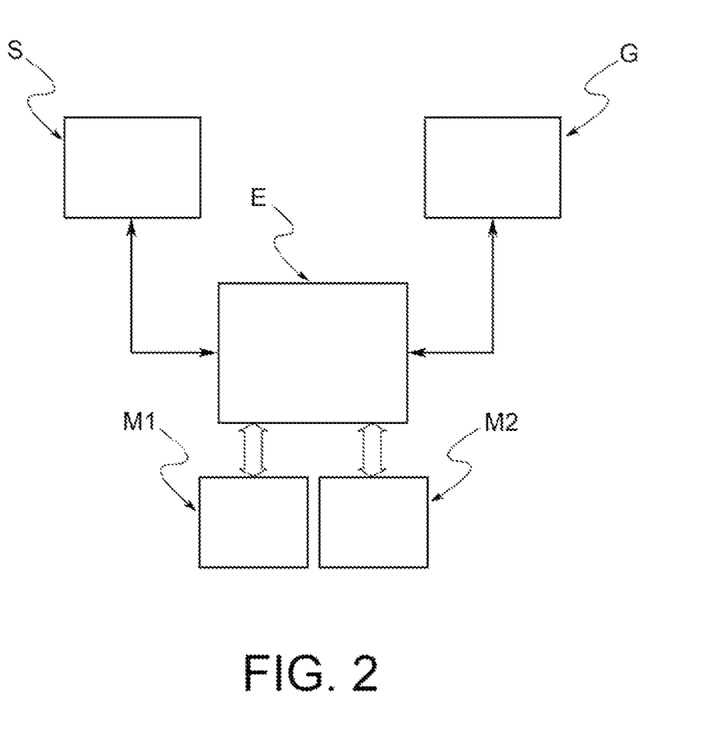
FIG. 2 is a block diagram of an on-board telematic unit integrating the accelerometer device shown in FIG. 1, arranged to carry out an embodiment of a calibration method according to the invention.

As indicated in detail in the block diagram of FIG. 2, as well as the sensor device "S," the telematic unit includes an electronic processing unit "E" (which, in turn, is coupled with a GPS receiver, generally indicated at "G" or, in an equivalent manner, another on-board sensor adapted to acquire reference data of the vehicle dynamics) for carrying out a calibration method that is described hereafter. Memory modules "M1" and "M2," typically a random-access-memory module "M1" for storing temporary data and the computing process and a flash-memory module "M2" for permanently storing data, are also associated with the processing unit "E."

The processing unit "E" is the calculation unit arranged to acquire acceleration data detected by the sensor device "S" in its own reference system (x,y,z) and convert them into the reference system of the vehicle (X,Y,Z) through a predetermined conversion matrix "R." The unit "E" is advantageously arranged to process the inertial data referring to the vehicle—i.e., identifying the orientation of the vehicle in space—and, on its movement dynamics, obtain a driving-assistance system.

The processing unit "E" is also arranged, according to an embodiment, to carry out the calibration of the sensor device "S"—i.e., to determine the coefficients of the conversion matrix R—on at least one occasion after the installation of the device or, according to an embodiment, periodically update such coefficients repeatedly (for example, according to a predetermined regular frequency or depending on the activation of the driving-assistance system that uses the measured data).

For example (but not exclusively), the telematic unit "T" can be mounted on board the vehicle and intended to make a system for tracking and recording the movements of the vehicle (for example, an accessory system to an anti-theft device, a system for detecting the movements of a vehicle belonging to a fleet, or even a system for detecting traffic violations or the dynamics of road accidents).

Figure 3:
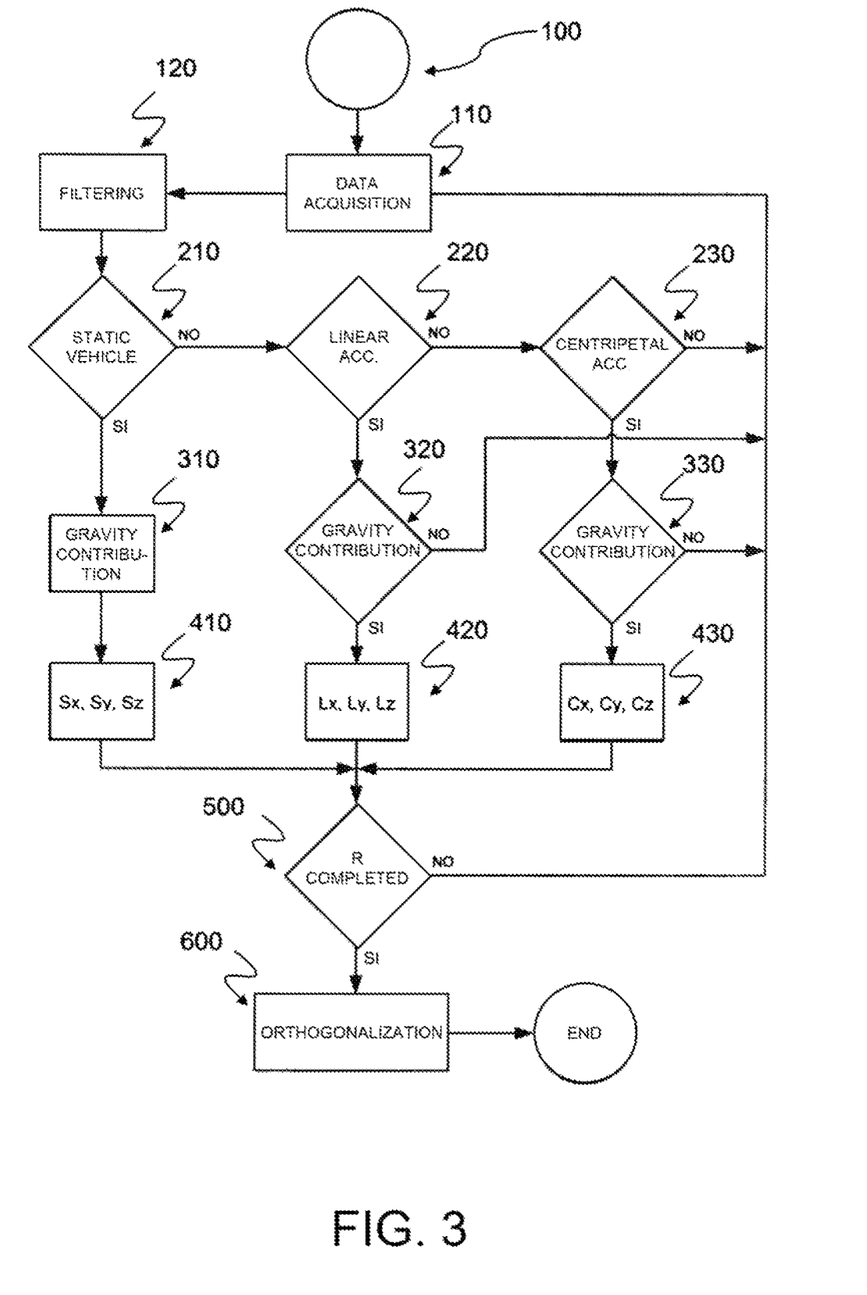
FIG. 3 is a flow diagram of the embodiment of the calibration method according to the invention of the accelerometer device shown in FIG. 1.

The calibration method is described in detail hereafter with reference to the flow diagram of FIG. 3. After preliminary initialization 100, the processing unit "E" in 110 acquires data indicative of the vehicle dynamics from the GPS receiver "G." Such data, typically the evolution of the position data of the vehicle over time, make it possible to determine corresponding reference data of the accelerations of the vehicle along the main axes "X," "Y," "Z."

By using the GPS data, the following dynamic conditions of the vehicle can be identified:

(1) vehicle at rest (zero speed, v~=0);
(2) vehicle braking or accelerating without changing direction (linear acceleration different from zero, zero centripetal-acceleration component);
(3) change in direction of the vehicle travelling at constant speed (centripetal-acceleration component different from zero); and
(4) other dynamic behavior, different from the previous ones.

Conditions (1), (2), and (3) make it possible to carry out the calibration method and determine the conversion matrix by combination of the data measured by the accelerometer device and reference data derived from the positioning data, as is referred to in detail hereafter. Condition (4) does not allow calibration, and, in such case, the method is automatically suspended, awaiting new usable data.

Condition (1) of the vehicle at rest can easily be determined also based on just the data of the on-board accelerometer device by calculating the variance of the measured-acceleration data and comparing it with a predetermined threshold to make the calibration method quicker. Alternatively, when the data of the accelerometer device is known in combination with the positioning data, the former cooperate to improve the determining of the conditions of the vehicle at rest detected through the latter.

In fact, in terms of vehicle dynamics, the condition of the vehicle at rest can be considered analogous to the condition in which the vehicle is in constant and uniform motion. Therefore, the condition of the vehicle in motion with constant speed and direction can also be used in the calibration method as an equivalent to condition (1) to increase the number of measurements available. Since the positioning data [for example, the satellite-positioning data (GPS)], does not include acceleration data, preliminary processing is necessary to obtain information concerning the vehicle dynamics.

Firstly, the positioning data is filtered to eliminate invalid data (i.e., the data acquired by the receiver "G" in uncertain or poor-quality positioning conditions). For this reason, the reliability parameters of the positioning data are compared with predetermined thresholds, and the data is discarded if at least one of the parameters does not respect the relative threshold. An example indicative of the thresholds of the reliability parameters is given below:

3D positioning;
HDOP<5;
Number of satellites in view>5; and
Minimum CN0 of 3 satellites with stronger signal>35 dBHz.

When the positioning is considered valid, from the positioning data, it is possible to work out the speed and direction of travel of the vehicle.

The linear acceleration "$Acc_L$" can be determined by applying the known expression:

$$Acc_L = (V(t) - V(t-\tau))/\tau,$$

where "$\tau$" is the GPS sampling period. The centripetal acceleration "$Acc_c$" is determined from the angular speed (derived from the direction of travel) and travelling speed, according to the expression:

$$Acc_c = V^*\omega [m/s^2],$$

where "V" is the linear speed expressed in [m/s] and "$\omega$" is the angular speed expressed in [rad/s], the latter deriving from the direction of travel ($\theta$) provided by the receiver "G" according to the relationship:

$$\omega = (\theta(t) - \theta(t-\tau))/\tau,$$

where "$\tau$" is the GPS sampling period.

The positioning data is filtered 120 to eliminate the noise, considering the dynamic limits of the vehicle. Experimentally, it has been found that a filter that provides a correct balance between performance and complexity (computing cost) is a "Butterworth" filter of the second order implementing the relationship:

$$OutData(i) = Input(i)*a(1) + Input(i-1)*a(2) + +Input(i-2)*a(3) - OutData(i-1)*b(2) + -OutData(i-2)*b(3),$$

where "Input" and "Outdata" are generically the input and output entities (specifically, "Input" represents the measurements of "V" and "$\omega$" and "Outdata" represents the "filtered" values of "V" and "$\omega$") and $$a(1) = 0.0134,\ a(2) = 0.0267,\ a(3) = 0.0134;\text{ and}$$

$$b(2) = -1.6475,\ b(3) = 0.7009.$$

In the case of invalid positioning data, the filter is re-initialized with the first valid data available, according to the relationships:

$$OutData(i) = Input(i);$$

$$OutData(i-1) = Input(i);\text{ and}$$

$$OutData(i-2) = Input(i).$$

Figure 4:
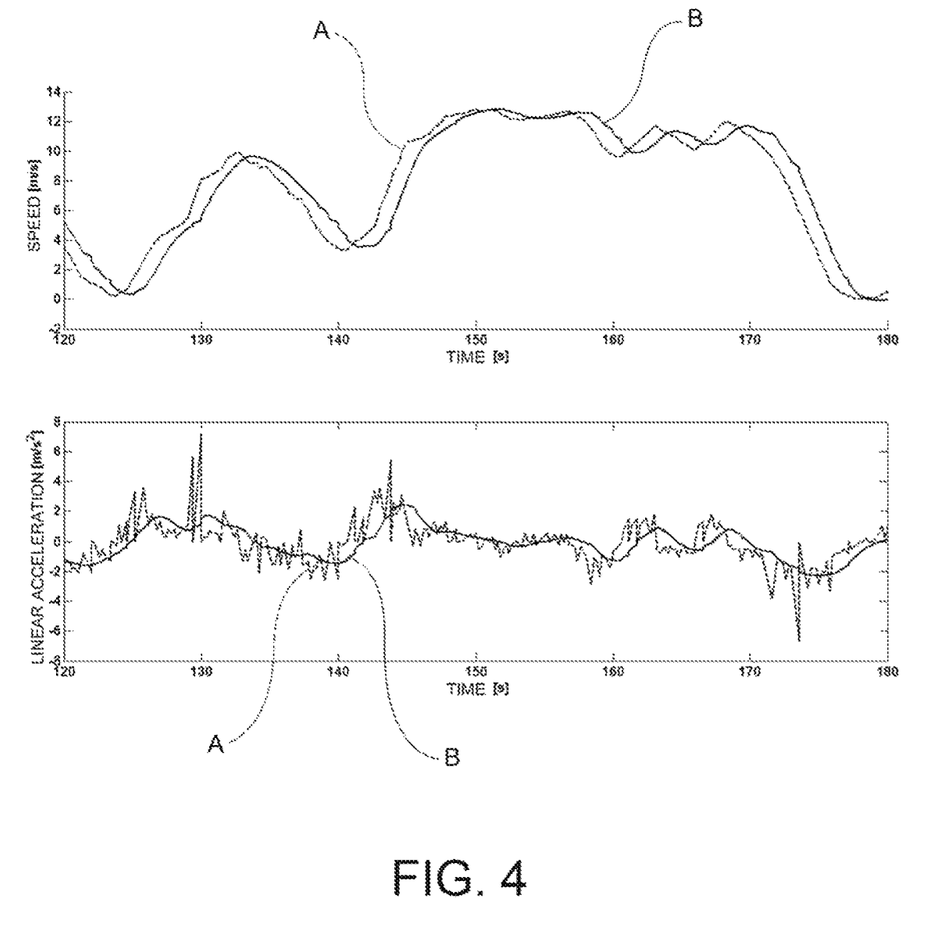
FIG. 4 shows two diagrams representative of the progress of the speed and linear acceleration of the vehicle over time, derived from satellite-positioning data of the vehicle, and subjected to filtering.

FIG. 4 shows two diagrams respectively representative of the progress of the speed and linear acceleration of the vehicle over time in which the curve indicated with "A" represents the progress of the entity detected and the curve indicated with "B" represents the progress of the filtered entity. The benefit of filtering is clear in determining linear acceleration. At the same time as the acquisition of the positioning data, the processing unit "E" acquires the vehicle dynamics from the accelerometer device "S," referring to the local axes "x," "y," "z" 110.

The acquisition of real-acceleration data from the on-board accelerometer device is substantially quicker than the acquisition of reference-acceleration data by about two orders of magnitude (for example, the acquisition of data from the accelerometer device occurs every 2.5 ms whereas the positioning data is available every 200 ms). For this reason and since, consequently, the calibration method cannot occur at a higher frequency than the updating frequency of the positioning data, the data of the accelerometer device is processed in advance. Advantageously, by exploiting the sampling speed of 2.5 ms, it is possible to collect four samples every 10 ms and, thus, average its value and subject the result to noise filtering 120, according to a technique analogous to the one described earlier in the processing of the positioning data. The coefficients of the "Butterworth" filter of the second order, implementing the relationship:

OutData($i$)=Input($i$)*a(1)+Input($i$−1)*a(2)+Input($i$−2)*a(3)−OutData($i$−1)*b(2)+−OutData($i$−2)*b(3), obtained experimentally for the accelerometer data, are:

a(1)=0.0009, a(2)=0.0019, a(3)=0.0009; and b(2)=−1.9112, b(3)=0.9150, where "Input" and "Outdata" generically represent the input and output entities of the filter (specifically, "Input" represents the acceleration measurements on the three axes (x,y,z) issued by the sensor and "Outdata" represents the filtered accelerations). Finally, the data of the accelerometer device is sampled over a time period of 200 ms to obtain the same timing as the data derived from the positioning data.

However, it should be noted that every filtering operation adds a delay to the propagation of the data being processed. For example, the repeated application of the filter described above to the acceleration data introduces a delay in propagation of the data of about one second. Once the measured-acceleration data has been acquired from the on-board accelerometer device and reference-acceleration data has been calculated from the positioning data, the two items of data must then be synchronized. Since the data deriving from the GPS information is the result of two filtering operations (filter of the GPS data and additional filtering) whereas the data of the accelerometer device is obtained by sampling in real time, the synchronization is necessary to take into account the delay in availability of the reference data of the delays introduced by the filters. Since the reference data is necessary to determine the calibration conditions (as is made clearer hereafter), the real-acceleration data is temporarily stored in buffer-memory modules of the memory bank "M1." The depth of the buffer used to store the data determines the synchronization delay applied.

Figure 5A:
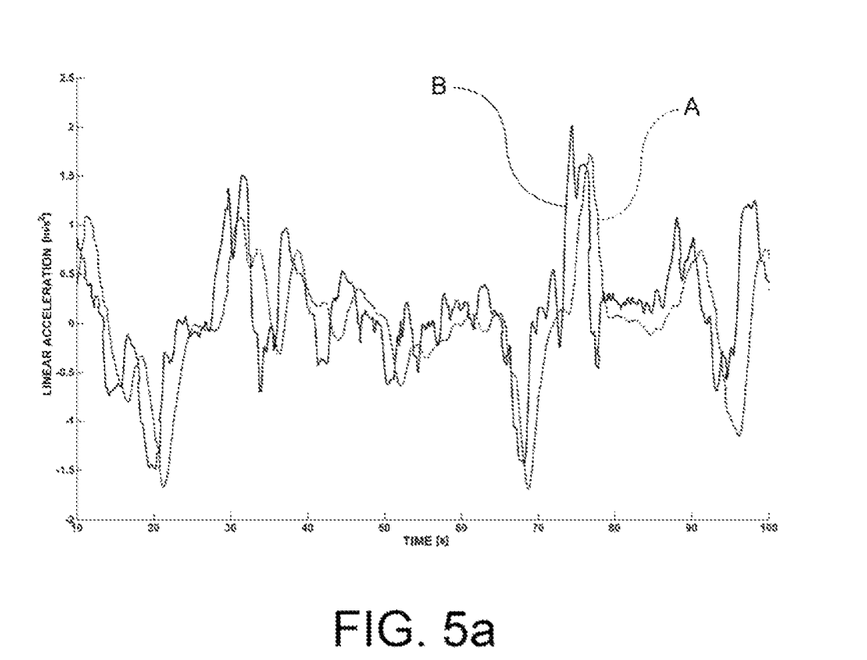
FIGS. 5a and 5b show a comparison on a time scale between the evolution of the reference-acceleration data and acceleration data measured by the on-board device before and after a synchronization operation, respectively.
Figure 5B:
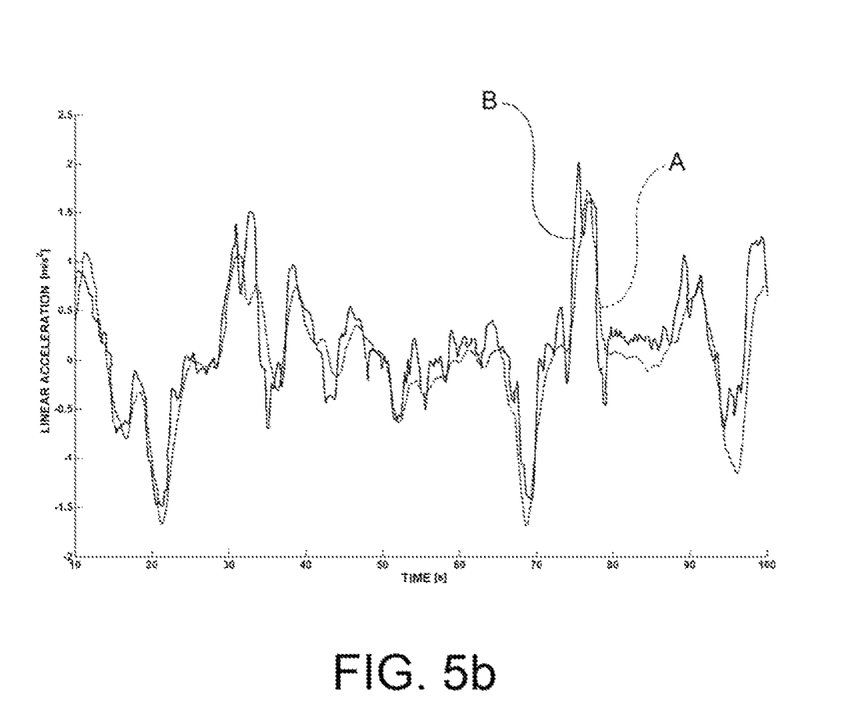

The diagram of FIG. 5a shows a real-time comparison on a time scale between the delayed evolution of the reference data deriving from the GPS-positioning data (curve indicated with "A" in the figures) and anticipated evolution of the real-acceleration data (curve indicated with "B" in the figures). FIG. 5b shows a comparative diagram between the evolution of the reference data deriving from the GPS-positioning data (curve "A") and evolution of the real-acceleration data (curve "B") after synchronization through the buffer memory with delay of 1000 ms (corresponding to 5 GPS-data samples).

Referring once again to the diagram of FIG. 3, once the acquisition of the real-acceleration data and reference-acceleration data has been carried out (advantageously filtered and synchronized), the processing unit "E" carries out the operations for calculating the coefficients of the conversion matrix.

At level 200, the current dynamic condition of the vehicle is verified by comparison of the positioning data and reference-acceleration data deriving from it with predetermined threshold values. Specifically, condition (1) of the vehicle at rest is determined if the following relationships are satisfied:

GPS Speed<$TH$.STATIC_SPD; and abs(GPS Acc$_L$)<$TH$.STATIC_ACC (i.e., if the detected speed is less than a first speed threshold and the linear acceleration is, in its absolute value, less than a first linear-acceleration threshold). In an embodiment, the threshold values are set as follows:

$TH$.STATIC_SPD=0.5 m/s; and $TH$.STATIC_ACC=0.7 m/s$^2$.

Condition (2) of linear acceleration is determined if the following relationships are satisfied:

GPS Speed>$TH$.LINEAR_SPD;

abs(GPS Acc$_L$)>$TH$.LINEAR_ACC; and abs(GPS Acc$_C$/GPS Acc$_L$)<$TH$.LIN_RATIO (i.e., if the detected speed is greater than a second speed threshold, the linear acceleration is, in its absolute value, greater than a second linear-acceleration threshold, and the absolute ratio between the centripetal acceleration and linear acceleration is less than a comparison-threshold value). In an embodiment, the threshold values are set as follows:

$TH$.LINEAR_SPD=3 m/s;

$TH$.LINEAR_ACC=1.2 m/s$^2$; and $TH$.LIN_RATIO=0.25.

Condition (3) of centripetal acceleration is determined if the following relationships are satisfied:

GPS Speed>$TH$.CENTR_SPD;

abs(GPS Acc$_C$)>$TH$.CENTR_ACC_C; and abs(GPS Acc$_L$/GPS Acc$_C$)<$TH$.CENTR_RATIO (i.e., if the detected speed is greater than a third speed threshold, the centripetal acceleration is, in its absolute value, greater than a first centripetal-acceleration threshold, and the absolute ratio between the linear acceleration and centripetal acceleration is less than the comparison-threshold value). In an embodiment, the threshold values are set as follows:

$TH$.CENTR_SPD=5 m/s;

$TH$.CENTR_RATIO=0.25; and $TH$.CENTR_ACC_C=1.3 m/s$^2$.

It should be noted that to determine the dynamic conditions of linear and centripetal acceleration of the vehicle, it is necessary for the latter to travel at a speed greater than a respective threshold. Otherwise, the speed and direction measurements made with the help of the GPS receiver would not be reliable.

The greater contribution of linear or centripetal acceleration is recognized through the calculation of the ratio between the two entities. The threshold value of 0.25 defines a maximum tolerated error of 25% for each measurement.

If condition (1) of the vehicle at rest is recognized in the threshold comparison 210, the method moves to 310 in which the contribution of the gravity acceleration on the accelerometer device is determined. The contribution of the gravity acceleration must be known for the calibration calculation in the linear- and centripetal-acceleration conditions. Therefore, it is necessary to acquire a predetermined minimum number (for example, fifty) of real-measured-data samples with the vehicle at rest to be able to also carry out the calibrations in the conditions of the vehicle accelerating.

If the outcome of the verification of the dynamic conditions of the vehicle in 200 is the recognition of a linear acceleration (or deceleration) in the threshold comparison 220, the method moves to 320 in which it is verified whether the calculation of the contribution of the gravity acceleration on the accelerometer device has been completed. Similarly, if the outcome of the verification of the dynamic conditions of the vehicle in 200 is the recognition of a condition of centripetal acceleration (or deceleration) in threshold comparison 230, the method moves to 330 in which it is verified whether the calculation of the contribution of the gravity acceleration on the accelerometer device has been completed.

Once the contribution of the gravity acceleration has been calculated as a function of the current dynamic condition, the processing unit "E" in level 400 updates the elements of the conversion matrix correlated to it.

The structure of the real conversion matrix "R" is represented below:

$$\begin{bmatrix} Lx & Cx & Sx \\ Ly & Cy & Sy \\ Lz & Cz & Sz \end{bmatrix},$$

with a notation of the elements that makes it possible to identify each of them as a function of the dynamic calibration condition during which it is determined (L=linear acceleration, C=centripetal acceleration, S=static condition or vehicle at rest) and the axis of the local reference system (x, y, z) to which it refers. For example, "Lx" is the element of the matrix determined in the dynamic condition of linear acceleration of the vehicle and relative to the measurement of the accelerometer device along the axis "x."

The conversion expression between the "accelerations" vector measured in the local reference system of the accelerometer ($ax_s$, $ay_s$, $az_s$) and "accelerations" vector in the reference system of the vehicle ($aX_V$, $aY_V$, $aZ_V$) is as follows:

$$\begin{bmatrix} aX_V \\ aY_V \\ aZ_V \end{bmatrix} = \begin{bmatrix} Lx & Cx & Sx \\ Ly & Cy & Sy \\ Lz & Cz & Sz \end{bmatrix} \begin{bmatrix} ax_S \\ ay_S \\ az_S \end{bmatrix}.$$

In an embodiment, in each iteration of the calibration method, the values of the elements of the matrix are attributed by applying a filtering operation that takes into account the number of previous measuring events—for example, according to the expression:

$$\text{Output} = (\text{Output}^* n_{step} + \text{New\_Value})/(n_{step}+1),$$

where "Output" is the generic parameter considered and in which, after every iteration, the iteration counter "$n_{step}$" (initialized at value "0" in 100) is increased: $n_{step} = n_{step} + 1$.

This filtering operation is a compromise among performance, simple implementation, and low memory and calculation needs. To avoid slowing down the calculations as the number of measurements increases and, at the same time, avoid attributing excessively low weights to new measurements, the filter is limited to a minimum weight of 1/400.

In the dynamic condition of the vehicle at rest, in 410, the processing unit updates the elements of the third column of the conversion matrix "Sx," "Sy," "Sz" as a function of the average values of the real-measured data "Acc_x," "Acc_y," "Acc_z" of the accelerometer device and values of the elements of the matrix calculated in the previous iteration according to the relationships:

$$Sx = (Sx^* n_{step} + \text{Acc\_}xS)/(n_{step}+1);$$

$$Sy = (Sy^* n_{step} + \text{Acc\_}yS)/(n_{step}+1); \text{ and}$$

$$Sz = (Sz^* n_{step} + \text{Acc\_}zS)/(n_{step}+1),$$

where $$\text{Acc\_}xS = \text{Acc\_}x/\text{sqrt}(\text{Acc\_}x^2 + \text{Acc\_}y^2 + \text{Acc\_}z^2);$$

$$\text{Acc\_}yS = \text{Acc\_}y/\text{sqrt}(\text{Acc\_}x^2 + \text{Acc\_}y^2 + \text{Acc\_}z^2); \text{ and}$$

$$\text{Acc\_}zS = \text{Acc\_}z/\text{sqrt}(\text{Acc\_}x^2 + \text{Acc\_}y^2 + \text{Acc\_}z^2),$$

and the values of the contributions of the gravity acceleration as:

$$G_X = (G_X^* n_{step} + \text{Acc\_}x)/(n_{step}+1);$$

$$G_Y = (G_Y^* n_{step} + \text{Acc\_}y)/(n_{step}+1); \text{ and}$$

$$G_Z = (G_Z^* n_{step} + \text{Acc\_}z)/(n_{step}+1).$$

In the dynamic condition of the vehicle subject to linear accelerations, in 420, the processing unit updates the elements of the first column of the conversion matrix "Lx," "Ly," "Lz" as a function of the average values of the real-measured data "Acc_x," "Acc_y," "Acc_z" of the accelerometer device and contributions of gravity calculated according to the relationships:

$$Lx = (Lx^* n_{step} + \text{Acc\_}xL)/(n_{step}+1);$$

$$Ly = (Ly^* n_{step} + \text{Acc\_}yL)/(n_{step}+1); \text{ and}$$

$$Lz = (Lz^* n_{step} + \text{Acc\_}zL)/(n_{step}+1),$$

where $$\text{Acc\_}xL = (\text{Acc\_}xl/\text{sqrt}(\text{Acc\_}xl^2 + \text{Acc\_}yl^2 + \text{Acc\_}zl^2))^* \text{sign}(\text{GPS\_Acc});$$

$$\text{Acc\_}yL = (\text{Acc\_}yl/\text{sqrt}(\text{Acc\_}xl^2 + \text{Acc\_}yl^2 + \text{Acc\_}zl^2))^* \text{sign}(\text{GPS\_Acc}); \text{ and}$$

$$\text{Acc\_}zL = (\text{Acc\_}zl/\text{sqrt}(\text{Acc\_}xl^2 + \text{Acc\_}yl^2 + \text{Acc\_}zl^2))^* \text{sign}(\text{GPS\_Acc}),$$

and $$\text{Acc\_}xl = \text{Acc\_}x - G_X;$$

$$\text{Acc\_}yl = \text{Acc\_}y - G_Y; \text{ and}$$

$$\text{Acc\_}zl = \text{Acc\_}z - G_Z,$$

in which "GPS_Acc" is the linear-acceleration value derived from the GPS-positioning data.

In the dynamic condition of the vehicle subject to centripetal acceleration, in 430, the processing unit updates the elements of the second column of the conversion matrix "Cx," "Cy," "Cz" as a function of the average values of the real-measured data "Acc_x," "Acc_y," "Acc_z" of the accelerometer device and calculated contributions of gravity according to the relationships:

$$Cx=(Cx*n_{step}+Acc\_xC)/(n_{step}+1);$$

$$Cy=(Cy*n_{step}+Acc\_yC)/(n_{step}+1); \text{ and}$$

$$Cz=(Cz*n_{step}+Acc\_zC)/(n_{step}+1),$$

where $$Acc\_xC=(Acc\_xc/\text{sqrt}(Acc\_xc^2+Acc\_yc^2+Acc\_zc^2))*\text{sign}(GPS\_Acc\_C);$$

$$Acc\_yC=(Acc\_yc/\text{sqrt}(Acc\_xc^2+Acc\_yc^2+Acc\_zc^2))*\text{sign}(GPS\_Acc\_C); \text{ and}$$

$$Acc\_zC=(Acc\_ZC/\text{sqrt}(Acc\_xc^2+Acc\_yc^2+Acc\_zc^2))*\text{sign}(GPS\_Acc\_C),$$

and $$Acc\_xc=Acc\_x-G_x;$$

$$Acc\_yc=Acc\_y-G_Y;$$

$$Acc\_zc=Acc\_z-G_Z,$$

in which "GPS_Acc_C" is the centripetal-acceleration value deriving from the GPS-positioning data.

If the calibration method is not complete—i.e., all of the elements of the conversion matrix have not been calculated—or calculation of the contributions of the gravity acceleration is not complete (for which reason the processing unit cannot proceed to calculate the elements of the matrix corresponding to the operative conditions in which the vehicle is subjected to linear or centripetal acceleration), there is another iteration of a new cycle of acquiring the positioning data, measuring the accelerometer data, synchronizing, and calculating the matrix elements, from 110 and 120.

The calibration method is considered adequately completed in 500 when the number of samples considered for each dynamic condition is greater than a predetermined threshold value (for example, three hundred). Of course, a different "completeness" threshold can be defined. Where the threshold value is greater, the time necessary to carry out the calibration is also longer, but the result is more accurate. When calibration is complete, it is possible to carry out a refinement of the conversion matrix by once again carrying out the calibration method and periodically updating the values of the elements of the matrix.

The conversion matrix "R" obtained at the end of the calibration method based on the data acquired is a real conversion matrix (the elements of which are affected by measuring errors for which reason it does not respect the requirement of orthogonality of the line vectors and column vectors). The conversion matrix is, therefore, subjected to orthogonalization in 600 (i.e., there is a calculation of the orthogonal-rotation matrix closest to the conversion matrix calculated through the measurements). Briefly, an orthogonal matrix is defined as a matrix the transpose of which is equal to the inverse ($Q^TQ=QQ^T=I$ or, in alternative notation, $Q^T=Q^{-1}$). An additional constraint for the rotation matrix is that the determinant is equal to one: $Det(Q)=1$.

To determine the orthogonal-rotation matrix "Ro" closest to the calculated real-conversion matrix "R," the following formula is applied:

$$Ro=R(R^TR)^{(1/2)}.$$

The orthogonal-conversion matrix closest to the above-calculated real conversion matrix advantageously makes it possible to redistribute the measuring errors suffered by the real conversion matrix over the entire orthogonal matrix—i.e., over all of the elements of the rotation matrix—and obtain a rotation matrix.

Advantageously, since the calculation of the orthogonal matrix is quite a difficult task in terms of computing for the processing unit "E," it may not be carried out for each periodic update of the conversion matrix, but only periodically (for example, every 150 updates). With the calculation of the orthogonal-rotation matrix, the calibration method ends, and the matrix is saved inside the non-volatile memory "M2." The calibration method described can be carried out just once when the vehicle starts or upon activation of the driving-assistance system that integrates the accelerometer measurements. Or, it can be carried out cyclically after the vehicle starts or after the activation of the driving-assistance system. In this case, it is foreseen for there to be a first quick, rough calibration cycle and subsequent fine calibration cycles.

Advantageously, as can be understood from reading the description above, the calibration method according to the invention leads to the generation of a coordinate-transformation matrix between the local reference system of the sensor device and reference system of the vehicle in which every coefficient is determined with greater accuracy with respect to the related art. Also, the calibration method according to the invention facilitates the installation of an inertial sensor—such as an attitude or movement sensor (in an embodiment, a tri-axial sensor)—on board a vehicle according to an arbitrary orientation, but making it possible to detect attitude or movement data of the vehicle that can be related to the main axes of the vehicle itself to be used for significant applications only in the context of a reference system centred on the vehicle. Furthermore, the calibration method according to the invention provides a satisfactory solution to the problem outlined above, avoiding the drawbacks of the related art. In addition, the calibration method according to the invention calibrates an inertial attitude- or movement-sensor device installed on board a vehicle in an arbitrary position and is as accurate as possible, with low errors in determining the coefficients of the coordinate-transformation matrix between the local reference system of the sensor device and reference system of the vehicle. Moreover, the calibration method according to the invention is automatic; requires simple implementation, minimal computing burdens, and low power consumption; and favors speed and accuracy of execution.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as specifically described above.

What is claimed is:

1. A method for calibrating an inertial-sensor device installed in an arbitrary position on board a vehicle and adapted to detect at least one entity indicative of dynamics of the vehicle along at least one direction of a local reference-coordinate system, said method comprising steps of:

acquiring by the inertial-sensor device at predetermined measuring times real-measured data indicative of the vehicle dynamics in the local reference-coordinate system;

acquiring by a calibrating detector different from the inertial-sensor device, at sampling times coinciding with the measuring times, reference-measured data indicative of the vehicle dynamics in a vehicle-coordinate system; and generating by a processing unit a coordinate-transformation matrix adapted to correlate the entity measured in the local reference-coordinate system with a corresponding entity in the vehicle-coordinate system, wherein all elements of the coordinate-transformation matrix are computed by comparing the real-measured data acquired by the initial-sensor device with corresponding the reference-measured data obtained in a plurality of different driving conditions, the real-measured data include a quantity of items of data substantially equal to a quantity of the elements of the coordinate-transformation matrix, and a value of each of the elements of the coordinate-transformation matrix is adjusted by forcing a constraint of orthogonality to obtain an orthogonal-transformation matrix that is closest to the coordinate-transformation matrix obtained based on the measured data, wherein $Ro=R(R^TR)^{-1/2}$ is applied to determine the orthogonal-transformation matrix that is closest to the coordinate-transformation matrix obtained based on the measured data.

2. A calibration method as set forth in claim 1, wherein the calibrating detector includes a satellite-positioning system.

3. A calibration method as set forth in claim 1, wherein the calibrating detector includes odometric sensors integrated on board the vehicle.

4. A calibration method as set forth in claim 1, wherein said method is carried out if a travelling speed of the vehicle is greater than a minimum threshold speed of the vehicle.

5. A calibration method as set forth in claim 1, wherein said method comprises further periodically updating the value of each of the elements of the coordinate-transformation matrix and computing the orthogonal-transformation matrix after a predetermined number of the updates.

6. A calibration method as set forth in claim 1, wherein computing the value of the elements of the coordinate-transformation matrix at each iteration of the calibration includes applying a filtering operation, taking into account a number of previous measuring events, according to: Output=(Output*nstep+New_Value)/(nstep+1).

7. A calibration method as set forth in claim 1, wherein said method is applied for calibrating a tri-axial accelerometer sensor.

8. A calibration method as set forth in claim 7, wherein the measured data indicative of the vehicle dynamics are substantially linear and centripetal-acceleration data detected in at least one of following dynamic conditions: the vehicle either of being substantially at rest and moving at a substantially constant and uniform speed; the vehicle either of substantially linearly accelerating and decelerating; and the vehicle changing its travel direction at a substantially constant speed.

9. A calibration method as set forth in claim 8, wherein the dynamic condition of the vehicle being substantially at rest is determined when a detected travelling speed of the vehicle is lower than a first speed threshold of the vehicle and an absolute value of a detected substantially linear acceleration of the vehicle is lower than a first linear-acceleration threshold of the vehicle.

10. A calibration method as set forth in claim 8, wherein the dynamic condition of the vehicle substantially linearly accelerating is determined when a detected travelling speed of the vehicle is greater than a second speed threshold of the vehicle, an absolute value of a detected substantially linear acceleration of the vehicle is greater than a second linear-acceleration threshold of the vehicle, and an absolute ratio between a detected centripetal acceleration and the detected substantially linear acceleration of the vehicle is lower than a comparison-threshold value.

11. A calibration method as set forth in claim 8, wherein the dynamic condition of centripetal acceleration is determined when a detected travelling speed of the vehicle is greater than a third speed threshold of the vehicle, an absolute value of a detected centripetal acceleration of the vehicle is greater than a first centripetal-acceleration threshold of the vehicle, and an absolute ratio between a detected linear acceleration and the detected centripetal acceleration of the vehicle is lower than a comparison-threshold value.

12. A calibration method as set forth in claim 1, wherein calibration-acceleration data detected at a plurality of subsequent sampling times and acceleration data measured at a plurality of subsequent measuring times are processed by applying a "Butterworth" filter of second order implementing following relationship: OutData(i)=Input(i)*a(1)+Input(i−1)*a(2)+Input(i−2)*a(3)−OutData(i−1)*b(2)+−OutData(i−2)*b(3), where "Input" and "Outdata" are dynamic input and output entities, respectively.

13. A calibration method as set forth in claim 1, wherein said method comprises further steps of determining contribution of gravity acceleration in a condition of the vehicle being at rest from a predetermined minimum number of real-measured-data samples and computing of the elements of the coordinate-transformation matrix as a function of the measured data obtained in driving conditions of linear and centripetal acceleration of the vehicle being carried out by taking into consideration the determined contribution of the gravity acceleration.

14. A sensor system of dynamics of a vehicle capable of being installed at an arbitrary position on board the vehicle, said sensor system comprising:

an inertial-sensor device adapted to detect at least one entity indicative of the vehicle dynamics along at least one direction of a local reference-coordinate system including a processor arranged for acquiring data detected by said inertial-sensor device in said local reference-coordinate system and converting said data in a vehicle reference system through a coordinate-transformation matrix computed by a calibration method, wherein $Ro=R(R^TR)^{-1/2}$ is applied to determine the orthogonal-transformation matrix that is closest to the coordinate-transformation matrix obtained based on the measured data.

* * * * *

UNITED STATES PATENT AND TRADEMARK OFFICE
CERTIFICATE OF CORRECTION

PATENT NO. : 8,825,274 B2
APPLICATION NO. : 13/336034
DATED : September 2, 2014
INVENTOR(S) : De Tommasi It is certified that error appears in the above-identified patent and that said Letters Patent is hereby corrected as shown below:

In the Claims

Column 13, Claim 6, line 50 after "($n_{step+1}$)" insert --, where "Output" is current value of a dynamic entity under consideration, "New_Value" is measured value of the dynamic entity, and "$n_{step}$" is a measuring counter.--

Signed and Sealed this
Seventeenth Day of February, 2015

Michelle K. Lee
*Deputy Director of the United States Patent and Trademark Office*